United States Patent [19]
Lindley

[11] 3,814,159
[45] June 4, 1974

[54] ARRANGEMENT FOR TUBELESS TIRE

[76] Inventor: William L. Lindley, P.O. Box 58584, Houston, Tex. 77058

[22] Filed: Nov. 15, 1972

[21] Appl. No.: 306,893

[52] U.S. Cl. .................................. 152/158, 152/98
[51] Int. Cl. ........................................... B60c 17/04
[58] Field of Search ............................ 152/158, 92

[56] References Cited
UNITED STATES PATENTS

| | | | |
|---|---|---|---|
| 1,211,694 | 3/1917 | Dam et al. | 152/92 |
| 1,537,674 | 5/1925 | Hoge | 152/92 |
| 1,567,400 | 12/1925 | Stitzel | 152/92 |
| 2,986,189 | 5/1961 | Lindley | 152/158 |
| 3,141,490 | 7/1964 | Lindley | 152/158 |
| 3,519,053 | 7/1970 | Lindley | 152/158 |
| 3,550,664 | 12/1970 | Lee | 152/158 |
| 3,682,219 | 8/1972 | Lindley | 152/158 |

*Primary Examiner*—Drayton E. Hoffman

[57] ABSTRACT

An arrangement for positioning inside a tubeless tire on a wheel rim includes annular segments that are adapted to be secured together to form a ring on the rim. A band surrounds the annular segments and has its end secured to an adjacent pair of the annular segments to provide a continuous surface. Resilient means, preferably in the form of spring means, is positioned on said annular segment and overlaps said band, with the annular segments and band being constructed and arranged to maintain said spring means thereon while accommodating circumferential movement of said spring along said band when the tubeless tire engages thereagainst to aid in feeding the tubeless tire around the wheel rim when deflated.

14 Claims, 4 Drawing Figures

PATENTED JUN 4 1974
3,814,159
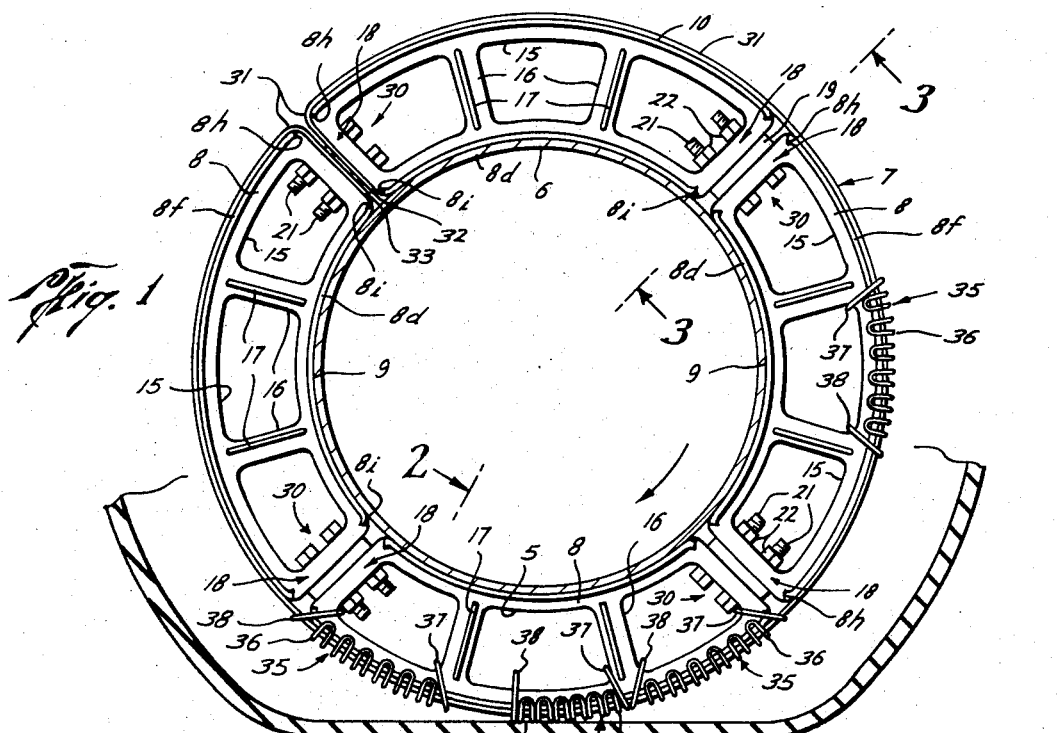
Fig. 1
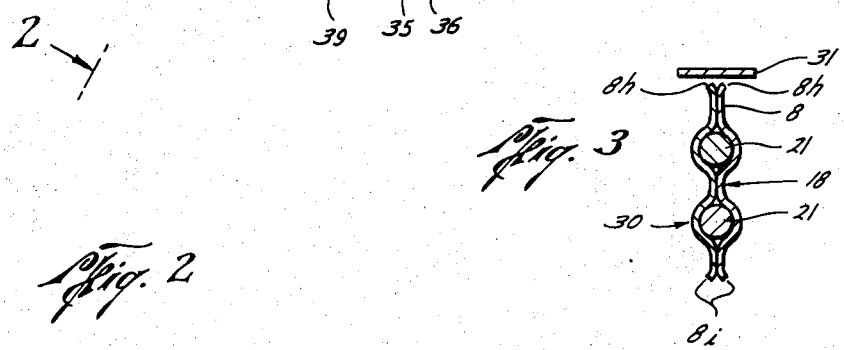
Fig. 2
Fig. 3
Fig. 4

ARRANGEMENT FOR TUBELESS TIRE

SUMMARY OF THE INVENTION

The present invention is an improvement relating to the same type of construction shown in my United States Letters Patent Nos. 2,986,189; 3,135,556; 3,141,490; 3,142,326; 3,180,391, 3,237,667; 3,394,749; 3,519,053; and 3,682,219.

The present invention provides an arrangement for positioning inside a tubeless tire on a wheel rim to accommodate movement of the tubeless tire when deflated without substantial damage thereto and wherein such arrangement may be readily and easily positioned on the rim.

Another object of the present invention is to provide an arrangement for positioning inside a tubeless tire on a wheel rim having a relatively simple and economical construction to accomplish the desired results of accommodating relative movement between a deflated tire and such arrangement on the rim and the surface over which the deflated tire moves.

Still another object of the present invention is to provide an arrangement for positioning inside a tubeless tire on a wheel rim which includes a configuration that moves circumferentially along the structure of the arrangement in response to demand as a deflated tire engages thereagainst to enable the deflated tire to pass between such arrangement and the surface over which the wheel rim is moving without substantial damage to the tire, and which configuration thereafter returns to its normal position for reactivation upon continued rotation of the wheel.

Other objects and advantages of the present invention will become more readily apparent from a consideration of the following description and drawings.

BRIEF DESCRIPTION OF THE DRAWINGS

FIG. 1 is an elevational view partly in section showing the present invention in its preferred embodiment mounted on a wheel rim and illustrating the manner in which a portion of the apparatus moves relative to and along the remainder of the arrangement for accommodating passage of a deflated tire;

FIG. 2 is a sectional view on a line 2—2 of FIG. 1 to illustrate the details of construction of the invention and the arrangement of a form of the resilient, or spring, means;

FIG. 3 is a sectional view on a line 3—3 of FIG. 1 illustrating an arrangement for securing the components of the invention together on a wheel rim; and FIG. 4 is a plan view illustrating one form of the resilient means as being spring means prior to its bending for fitting in the manner shown in FIG. 1.

DESCRIPTION OF THE PREFERRED EMBODIMENT

Attention is first directed to FIG. 1 of the invention wherein a wheel rim is referred to generally by the numeral 6 and may be of any suitable form, such as by way of example only, the type commonly referred to as a drop center rim. The present invention is referred to generally by the numeral 7 and includes a plurality of annular segments 8, four of which are illustrated. Any suitable number of annular segments may be employed as desired, and it has been found that four annular segments 8 provide desirable characteristics in that they may be readily and easily positioned on a wheel rim having a tubeless tire thereon with a minimum of effort, while providing the necessary structural strength and other advantages as will be described in greater detail hereinafter.

The annular segments 8 are shown in greater detail in FIG. 2 as being formed of arcuate plates 8a and 8b which may be secured together in any suitable manner such as by welding or the like. The plates are provided with flanges 8c, 8d at one end, and 8e and 8f at the other end, as illustrated in FIG. 2. The flanges 8c and 8d form the inner and outer circumferential periphery 9 and 10, respectively, of the annular segments 8.

The annular segments 8 also include a plurality of cutout portions 15 separated by the portions 16 of the annular segments. The portions 16 are provided with suitable reinforcing ribs 17 to lend structural strength to the arrangement of the present invention.

The flanges 8c, 8d terminate as illustrated at 8i at each end of each annular segment 8 and the flanges 8e, 8f terminate as illustrated at 8h at the end of each annular segment. The end portions referred to generally at 18 of each annular segment are provided with a suitable arrangement for receiving a locking or securing means referred to generally by the numeral 30 as will be described in greater detail hereinafter.

It can be appreciated that the annular segments 8 could be formed of integral material if desired.

The end portions 18 of the annular segments comprising the plates 8 are positioned in spaced relation to provide a space between adjacent segments as shown more clearly in FIG. 3 of the drawings. A spacer 19 is provided between adjacent annular segments 8 as illustrated in FIG. 1 of the drawings, where desired, for adapting the present invention to various size wheel rims. The securing means 30 may be in the form of bolts 21 and nuts 22 for securing through each of the ends of adjacent annular segments 8 to retain them in position and form a ring when assembled that fits on the wheel rim 6.

During assembly of the segments 8, an annular band 31 is provided having its ends 32 and 33 positioned between two adjacent annular segments 8 and preferably extends about the periphery of the annular segments as illustrated, to be secured by the means 30 previously referred to.

Resilient means referred to generally at 35 are provided on the annular segments 8, such resilient means being illustrated as in the form of the spring 36 which overlaps the band 31 and the flanges 8e and 8f of the annular segments at each outer, annular circumferential edge as more clearly illustrated in FIG. 2 of the drawings. In FIG. 4 the spring means 36 is shown in its flat form prior to being bent in position over the band 31 and circumferential flanges 8e and 8f of the annular segments 8. The ends 37 and 38 in the form of the invention illustrated are positioned adjacent the respective ends of the openings 15 as shown in FIG. 1 of the drawings and the outer circumference of the spring 36 represented by the dotted line 39 extends in a plane generally coaxial with the band 31 and the outer circumferential periphery of the annular segments 8 formed by the flanges 8e and 8f.

The forming of the spring 36 on the annular segments is in a manner so that the ends 37 and 38 position the spring 36 on the annular segments 8, but accommodate free circumferential movement of the spring 36 along the band 31 and annular segment 8 upon which it is positioned.

For example, as shown in FIG. 1, when the tire deflates and engages against the spring 36, as the wheel rotates, it is desirable to have the tire move between the wheel rim and the surface over which the tire is rotating in a manner so as not to cause damage to the tire.

The present invention accomplishes such function in that as the tire tends to "bunch up" by reason of its deflated condition and by reason of its engagement against the surface on which it is rotating and the arrangement of the present invention, the spring means 36 will tend to collapse as illustrated in FIG. 1 to aid in feeding or passing the tire around the wheel rim as it rotates. After the spring has served its function and moved out of engagement with the deflated tire and the surface on which the tire is moving, the spring will return to its original position as illustrated in FIG. 1.

It will be noted that a spring 36 is provided for each of the openings 15 in the annular segments 8, so that a plurality of springs is provided for each of such annular segments.

Under some circumstances, it may be desirable to provide a single continuous spring extending around the band 31 which will move as above described in response to engagement between the deflated tire and the arrangement of the present invention.

It will be noted that the present invention comprises a minimum number of moving parts and may be formed in a relatively easy and inexpensive manner.

In mounting the present invention on a wheel rim 6, all of the segments may be loosely connected together with the exception of those two segments to which the end of the band is to be engaged. After they have been positioned within the deflated tire on the wheel rim, then all of the securing means 30 may be tightened to secure the annular segments on the wheel rim so that the flanges 8c and 8d thereof remain in contact with the wheel rim and properly secure and maintain such annular segments in position during use of the present invention.

The foregoing disclosure and description of the invention are illustrative and explanatory thereof, and various changes in the size, shape, and materials as well as in the details of the illustrated construction may be made without departing from the spirit of the invention.

What is claimed is:

1. An arrangement for positioning inside a tubeless tire on a wheel rim comprising:
   a. annular segments;
   b. flange means extending circumferentially along the inner and outer periphery of said segments;
   c. annular band means extending along the outer periphery of said segments;
   d. means for securing said annular segments and band in position on a wheel rim; and
   e. resilient spring means positioned on said annular segments and overlapping said band for movement circumferentially along said band when the tubeless tire engages thereagainst to aid in feeding the tubeless tire around the wheel rim.

2. The invention of claim 1 wherein said spring means is formed so that it has an outer circumference substantially coaxial to said annular band means.

3. The invention of claim 2 wherein said spring means includes edge portions bent over the edges of said annular band means and said annular segments.

4. The invention of claim 1 wherein said spring means extends substantially continuously about said annular band and includes ends positioning said spring means on said annular band while accommodating longitudinal movement of said spring means circumferentially along said annular band.

5. The invention of claim 3 wherein said spring means extends substantially continuously about said annular band and includes ends positioning said spring means on said annular band while accommodating longitudinal movement of said spring means circumferentially along said annular band.

6. The invention of claim 1 wherein said spring means includes a plurality of springs positioned circumferentially in end-to-end relationship on said annular segments.

7. The invention of claim 6 wherein each of said spring means is formed so that they have an outer circumference substantially coaxial to said annular band means.

8. The invention of claim 7 wherein said spring means includes edge portions bent over the edges of said annular band means and said annular segments.

9. The invention of claim 1 wherein said annular segments are connected together adjacent each of their ends.

10. The invention of claim 1 wherein said band means is continuous to surround all of said annular segments and has end portions secured to adjacent annular segments.

11. The invention of claim 1 wherein said securing means comprises bolt and nut means extending through adjacent annular segments to form a ring.

12. The invention of claim 11 including spacer means between adjacent annular segments.

13. The invention of claim 1 wherein said annular segments are constructed and arranged to receive and maintain said spring means on said band means and annular segments while accommodating circumferential movement of said spring means along said band means and said annular segments.

14. The invention of claim 1 wherein said annular segments each include more than one spring means and wherein said annular segments are constructed and arranged to receive and maintain each of said spring means on said band means and annular segments while accommodating independent circumferential movement of each said spring means along said band means and annular segments.

* * * * *